(12) United States Patent
Das et al.

(10) Patent No.: US 9,161,246 B2
(45) Date of Patent: *Oct. 13, 2015

(54) COST OPTIMIZATION OF WIRELESS-ENABLED METERING INFRASTRUCTURES

(71) Applicants: Arnab Das, Washington, DC (US); Santanu Das, Monroe, CT (US)

(72) Inventors: Arnab Das, Washington, DC (US); Santanu Das, Monroe, CT (US)

(73) Assignee: Net IP, LLC, Monroe, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/046,894

(22) Filed: Oct. 4, 2013

(65) Prior Publication Data

US 2014/0105104 A1    Apr. 17, 2014

Related U.S. Application Data

(63) Continuation of application No. 13/476,013, filed on May 20, 2012, now Pat. No. 8,619,657.

(60) Provisional application No. 61/488,459, filed on May 20, 2011.

(51) Int. Cl.
*H04B 7/185* (2006.01)
*H04W 24/02* (2009.01)
*H04W 84/18* (2009.01)
*H04W 4/00* (2009.01)

(52) U.S. Cl.
CPC .............. *H04W 24/02* (2013.01); *H04W 4/006* (2013.01); *H04W 84/18* (2013.01)

(58) Field of Classification Search
CPC ...... H04W 24/02; H04W 84/18; H04W 4/006
USPC .......... 370/252, 256, 311, 318, 328, 331, 338
See application file for complete search history.

(56) References Cited

U.S. PATENT DOCUMENTS

| | | | | |
|---|---|---|---|---|
| 6,105,018 | A * | 8/2000 | Demers et al. | 1/1 |
| 7,430,186 | B1 * | 9/2008 | Kim | 370/328 |
| 7,668,665 | B2 * | 2/2010 | Kim | 702/33 |
| 7,738,413 | B2 * | 6/2010 | Varaiya et al. | 370/321 |
| 7,890,301 | B2 * | 2/2011 | Warrior et al. | 702/188 |
| 7,940,177 | B2 * | 5/2011 | Krill | 340/545.3 |
| 8,111,170 | B2 * | 2/2012 | Wilson et al. | 340/853.2 |
| 8,175,016 | B1 * | 5/2012 | Basu et al. | 370/311 |
| 8,532,008 | B2 * | 9/2013 | Das et al. | 370/311 |

(Continued)

*Primary Examiner* — Brian O'Connor
(74) *Attorney, Agent, or Firm* — Greer, Burns & Crain, Ltd.

(57) ABSTRACT

Embodiments of the present disclosure include a system for managing cost in a wireless enabled advanced metering infrastructure (AMI). The system includes a remote server, a wide area network, and an access point device. The system further includes wireless enabled meters coupled to each other and to the access point through a neighborhood area network (NAN). The system includes datasinks. Each datasink is a wireless enabled meter capable of being a data coordinator and capable of receiving metering information from the sensors, processing metering information, and transmitting metering information to the access point. Moreover, each wireless enabled meter is capable of being a routing node and an endpoint node. Also, a first set of wireless enabled meters are configured to be routing nodes and a second set of wireless enabled meters are configured to be endpoint nodes based on a graph theoretic algorithm to reduce the cost of the AMI.

28 Claims, 15 Drawing Sheets

(56) References Cited

U.S. PATENT DOCUMENTS

| | | | |
|---|---|---|---|
| 8,619,657 B2 * | 12/2013 | Das et al. | 370/311 |
| 2003/0063585 A1 * | 4/2003 | Younis et al. | 370/331 |
| 2008/0238716 A1 * | 10/2008 | Ehrke et al. | 340/870.03 |
| 2011/0115643 A1 * | 5/2011 | Gilbert et al. | 340/870.09 |

* cited by examiner

|   | A | B | C | D | E | F |
|---|---|---|---|---|---|---|
| A | 0 | 1 | 3 | 4 | 3 | 1 |
| B | 1 | 0 | 2 | 3 | 2 | 2 |
| C | 3 | 2 | 0 | 1 | 2 | 2 |
| D | 4 | 3 | 1 | 0 | 1 | 3 |
| E | 3 | 2 | 2 | 1 | 0 | 2 |
| F | 1 | 2 | 2 | 3 | 2 | 0 |

Figure 5

| Link 1 | A | B |
| --- | --- | --- |
| Link 2 | C | D |
| Link 3 | D | E |
| Link 4 | F | A |
| Link 5 | B | C |

Figure 6

|   | A | B | C | D | E | F | G | H | I | J |
|---|---|---|---|---|---|---|---|---|---|---|
| A | 0 | 3 | 2 | 2 | 2 | 2 | 3 | 4 | 1 | 3 |
| B | 3 | 0 | 2 | 2 | 4 | 3 | 2 | 1 | 3 | 1 |
| C | 2 | 2 | 0 | 1 | 4 | 3 | 1 | 3 | 3 | 1 |
| D | 2 | 2 | 1 | 0 | 3 | 2 | 1 | 3 | 2 | 1 |
| E | 2 | 4 | 4 | 3 | 0 | 2 | 4 | 4 | 1 | 4 |
| F | 2 | 3 | 3 | 2 | 2 | 0 | 3 | 4 | 1 | 3 |
| G | 3 | 2 | 1 | 1 | 4 | 3 | 0 | 2 | 3 | 1 |
| H | 4 | 1 | 3 | 3 | 4 | 4 | 2 | 0 | 3 | 2 |
| I | 1 | 3 | 3 | 2 | 1 | 1 | 3 | 4 | 0 | 3 |
| J | 3 | 1 | 1 | 1 | 4 | 3 | 1 | 2 | 3 | 0 |

Figure 8

COST OPTIMIZATION OF WIRELESS-ENABLED METERING INFRASTRUCTURES

CROSS-REFERENCE TO RELATED APPLICATIONS

The present application is a continuation patent application and claims priority under the laws and rules of the United States, including 35 USC §120, to U.S. patent application Ser. No. 13/476,013 filed on May 20, 2012, which in turn claims priority under the laws and rules of the United States, including 35 USC §120, to U.S. Provisional Patent Application No. 61/488,459 filed on May 20, 2011. The contents of U.S. Provisional Patent Application No. 61/488,459 filed on May 20, 2011 and U.S. patent application Ser. No. 13/476,013 are herein incorporated by reference in their entireties.

BACKGROUND

The Internet is now moving from an "Internet of Human Beings" to an "Internet of Things." The trend is to wirelessly connect millions of objects like thermostats, electric power meters, and every conceivable machine we use in our daily lives directly or indirectly to one another and to Access Points (APs) and servers so that these objects are managed in an optimal manner.

The pending disclosure describes an Advanced Metering Infrastructure (AMI) that includes a collection of Neighborhood Area Networks (NANs) having smart, wireless-enabled mesh-connected meters or sensor nodes. The NAN is a type of Wireless Sensor Network (WSN) which meshes wireless-enabled meters together for applications such as electric meter reading. The meters are generally wireless-enabled by incorporating a module which allows two-way communication between the meter and an access point using wireless protocols known in the art. The wireless-enabled meter thus, may be called a "sensor node."

SUMMARY

An objective of the present disclosure is to ensure that the ratio of the number of meters (sensor nodes) to that of APs is maximized. Further, the ratio of the number of meter to APs may also be a cost for the NAN. Each NAN generally corresponds to, for example, a number of homes with wireless-enabled meters, which need to be read as needed for billing or other purposes such as implementing a "demand response" system.

The number of meters and their type could be large and varied, especially in industrial applications. Thus, maximizing the ratio of the number of meters or sensor nodes to that of APs may be important because of the sheer number of meters or sensor nodes involved, and the fact that the nodes could be distributed over a wide area, including in locations which are not easily accessible. The cost of a gateway or AP is generally considered to be higher than that of a wireless module in a meter. Further, the backhauling cost associated with interconnecting APs to each other and to the central server may also expensive. Embodiments of the present disclosure optimize the cost of a NAN by maximizing the ratio of the number of sensor nodes or meters to that of gateways or Access Points (APs).

Embodiments can use an elegant graph-theoretic approach to model the nodes (meters) in a NAN and the links interconnecting all of the node pairs as a set of vertices and edges of a weighted graph and obtain a minimum spanning tree. The resulting NAN structure operates in a multi-hop mode in such a way that the links utilized are of minimum distance and the network is connected with no isolated nodes. The minimum spanning tree structure maximizes the ratio of sensor nodes to that of gateways, optimizing the overall system cost.

The ratio of the number of sensor nodes or meters to that of APs can be further improved by using strategically-placed "dummy" sensor nodes or repeaters for bridging disconnected sets of nodes. This further reduces the overall network cost. Embodiments can automatically pinpoint the locations where these repeaters need to be placed.

Embodiments of the present disclosure include a system for managing cost in a wireless enabled advanced metering infrastructure that includes one or more NANs. NANs can also be called wireless sensor networks where sensor can be called meters and measuring or metering temperature, gas, electricity water, or anything known in the art. Cost can be a ratio number meters to access points but also power, distance, area of coverage, etc. The system includes a remote server, a wide area network coupled to the remote server, and at least one access point device coupled to the remote server through the wide area network. The system further includes one or more wireless enabled meters coupled to each other and to the access point through a neighborhood area network. NAN may be meter network or any kind of wireless sensor network wide area network. Protocols used in a NAN could be WiFi, Zigbee, or ISM band, or anything of that nature known in the art. In addition, the system includes one or more datasinks wherein each datasink is a wireless enabled meter capable of being a data coordinator and capable of receiving metering information from the one or more sensors, processing metering information, and transmitting metering information to at least access point. Moreover, each wireless enabled meter is capable of being a routing node and an endpoint node. Also, a first set of wireless enabled meters are configured to be one or more routing nodes and a second set of wireless enabled meters are configured to be one or more end point nodes based on a graph theoretic algorithm to reduce the cost of the advanced metering infrastructure.

In an alternative embodiment, two overpowered sensors are identified in the wireless sensor network that have a transmitting power more than a power constraint and a dummy node that is placed in between the two overpowered sensors such that the transmitting power of the two overpowered sensors and the dummy node are below the power constraint;

The graph theoretic algorithm includes selecting a link wherein the link couples a node pair and a node can be selected from the group consisting of an access point, datasink, routing node, or endpoint node as well as mapping the distance between the selected node pairs to a corresponding bridging power level wherein the bridging power level between a node pair is designated as a weight of the link. Further, the graph theoretic algorithm includes ranking the weighted links for each corresponding node pair in nondecreasing order of weight as well as selecting a next least weighted link and corresponding node pair as part of a subgraph. In addition, the graph theoretic algorithm includes repeating the selecting of the next least weighted link and corresponding node pair as part of the subgraph until every node is part of the subgraph and generates a spanning tree.

The graph theoretic algorithm results in increasing the ratio of wireless enabled meters to access points in a neighborhood area network. The remote server uses the graph theoretic algorithm to configure the first set of wireless enabled meters as routing nodes and the second set of wireless enabled meters as end point nodes over the wide area network and through the access point. The datasink: (i) receives metering information corresponding to each of the one or more routing nodes and one or more end point nodes; and (ii) processes the meter information to generate sub-network status information and transmits the sub-network status information to the access point. The access point transmits the metering information and the sub-network status information to the remote server over the wide area network.

The remote server processes the metering information for a subset of the one or more routing nodes and one or more end point nodes and the network and sub-network status information and modifies the configuration of the one or more routing nodes and one or more end point nodes based on the metering information and network and sub-network status information to generate a reconfigured operational neighborhood area network.

The system further includes a remote computing device coupled to the access point and the remote server over the wide area network, the remote computing device having a user interface capable of receiving user input and retrieving and displaying metering information and network and sub-network status information.

The remote computing device is capable modifying a configuration of a subset of neighborhood area networks based on user input and the metering information and network and sub-network status information.

The datasink (i) receives sensor information corresponding to each of the one or more routing sensors and one or end point sensors; (ii) processes the sensor information to generate sub-network status information; and (iii) transmits the sensor information and the sub-network status information to the access point, the access point transmits the sensor information and the sub-network status information to the remote computing device and the remote server over the wide area network.

The graph theoretic algorithm may be Kruskal's algorithm which is used to generate spanning tree. Further, placement of one or more dummy nodes in the wireless sensor network maximizes a ratio of sensors to access points.

Embodiments of the disclosure also include a system for managing cost in a wireless enabled advanced metering infrastructure. The system includes a remote server, a wide area network coupled to the remote server, at least one access point device coupled to the remote server through the wide area network, one or more wireless enabled meters coupled to each other and to the access point through a neighborhood area network, and one or more datasinks wherein each datasink is a wireless enabled meter capable of being a data coordinator and capable of receiving metering information from the one or more sensors, processing metering information, and transmitting metering information to at least access point. Each wireless enabled meter is capable of being a routing node and an endpoint node. Further, a first set of wireless enabled meters are configured to be one or more routing nodes and a second set of wireless enabled meters are configured to be one or more end point nodes based on a graph theoretic algorithm to reduce the cost of the advanced metering infrastructure. In addition, one more neighborhood area networks are bridged by one or more dummy nodes to increase ratio of meters to access points.

An embodiment includes an access point device for managing cost in an AMI (advanced metering infrastructure). The access point includes a processor, a memory coupled to the processor and one or more communication interfaces coupled to the processor. The access point (i) stores the sensor information and the network information in the memory; (ii) receives sensor information corresponding to each of the one or more routing sensors and one or end point sensors form the one or more communication interfaces; (iii) processes the sensor information to generate network information using the processor implementing a graph theoretic algorithm; and (iv) transmits the sensor information and the network information to the one or more communication interfaces.

Embodiment include a remote server device for managing cost in an AMI. The remote server includes a processor, a memory coupled to the processor, and one or more communication interfaces coupled to the processor. The remote server (i) stores the sensor information and the network information in the memory; (ii) processes the sensor information for a subset of the one or more routing sensors and one or more end point sensors and the network information using the processor implementing a graph theoretic algorithm; (iii) transmits reconfiguration data of the one or more routing sensors and one or more end point sensors based on the sensor information and network information using the processor through the one or more communication interfaces.

The foregoing are illustrative embodiments and are not limiting in scope of the disclosure.

BRIEF DESCRIPTION OF THE SEVERAL VIEWS OF THE DRAWINGS

The accompanying drawings, which are incorporated in and constitute part of this specification, illustrate embodiments of the invention and together with the description serve to explain the principles of the present disclosure. The embodiments illustrated herein are presently preferred, it being understood, however, that the invention is not limited to the precise arrangements and instrumentalities shown, wherein:

FIG. 5 show an exemplary input matrix based on graph shown in FIG. 3;

FIG. 6 show an exemplary output matrix of links of resulting minimum spanning tree;

FIG. 8 shows the exemplary matrix of distances mapped to the weights on the graph illustrating aspects of the present disclosure;

DETAILED DESCRIPTION

The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of difference configurations, all of which are explicitly contemplated herein. Further, in the foregoing description, numerous details are set forth to further describe and explain one or more embodiments. These details include system configurations, block module diagrams, flowcharts (including transaction diagrams), and accompanying written description. While these details are helpful to explain one or more embodiments of the disclosure, those skilled in the art will understand that these specific details are not required in order to practice the embodiments.

Figure 1:
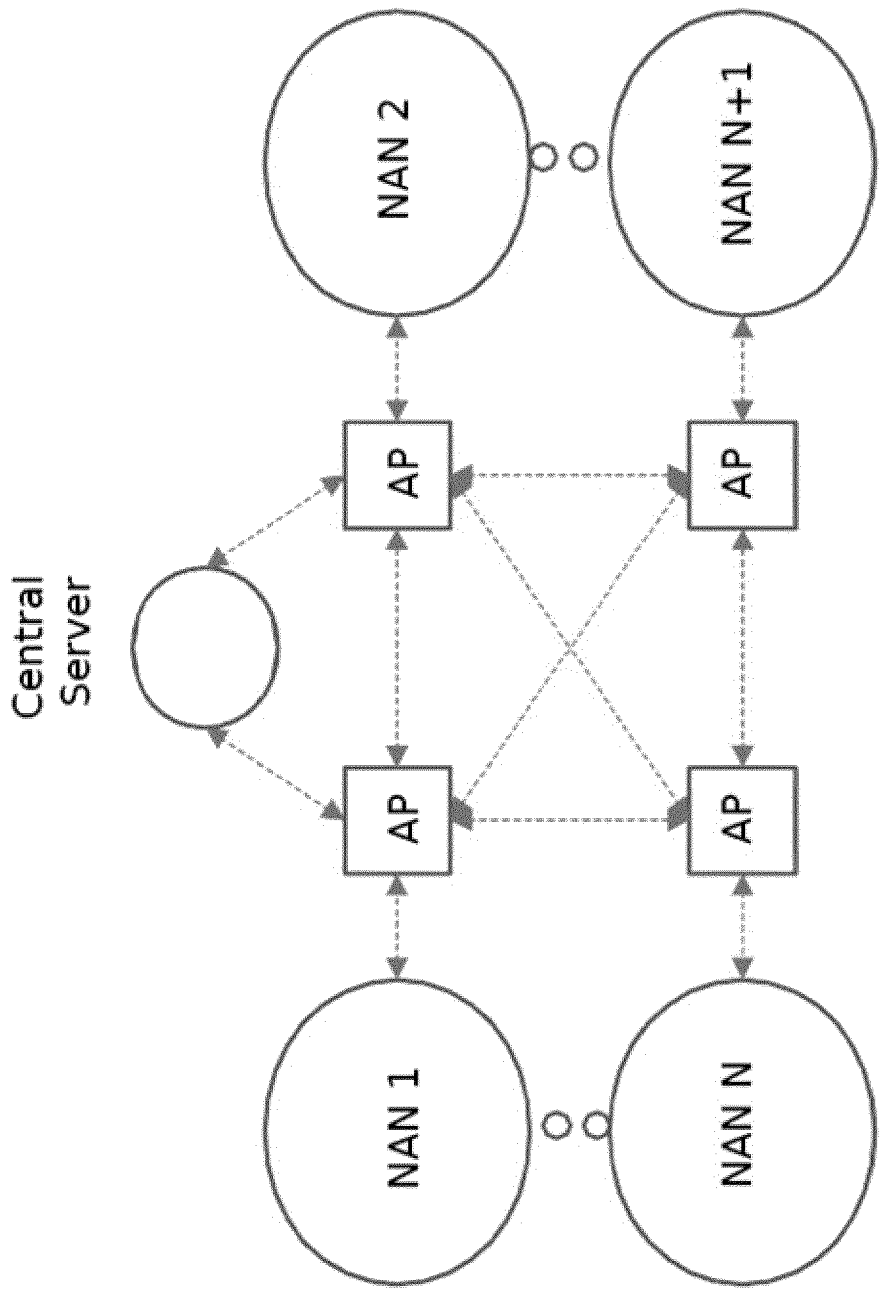
FIG. 1 shows an exemplary neighborhood area network arrangement (NAN) for interconnecting a cluster of sensors or meters to gateways or APs and the interconnection of gateways through wide area links to a central server.

FIG. 1 shows a neighborhood area network arrangement (NAN) for interconnecting a cluster of sensors or meters to gateways or APs and the interconnection of gateways through wide area links (links based on Wi-Fi, GSM, or other technologies) to a central server. The sensor nodes could correspond to wireless-enabled electric power meters, gas meters, water meters, or other devices/appliances.

It is assumed that each meter, which is a sensor node, is wireless-enabled using a standard WiFi, Zigbee or ISM (industrial, scientific, and medical band) module. Also, the distances between any node (meter) pair are known. Of course, the metering or sensor nodes could be interconnected using any wireless protocol and can be is protocol agnostic.

Figure 2:
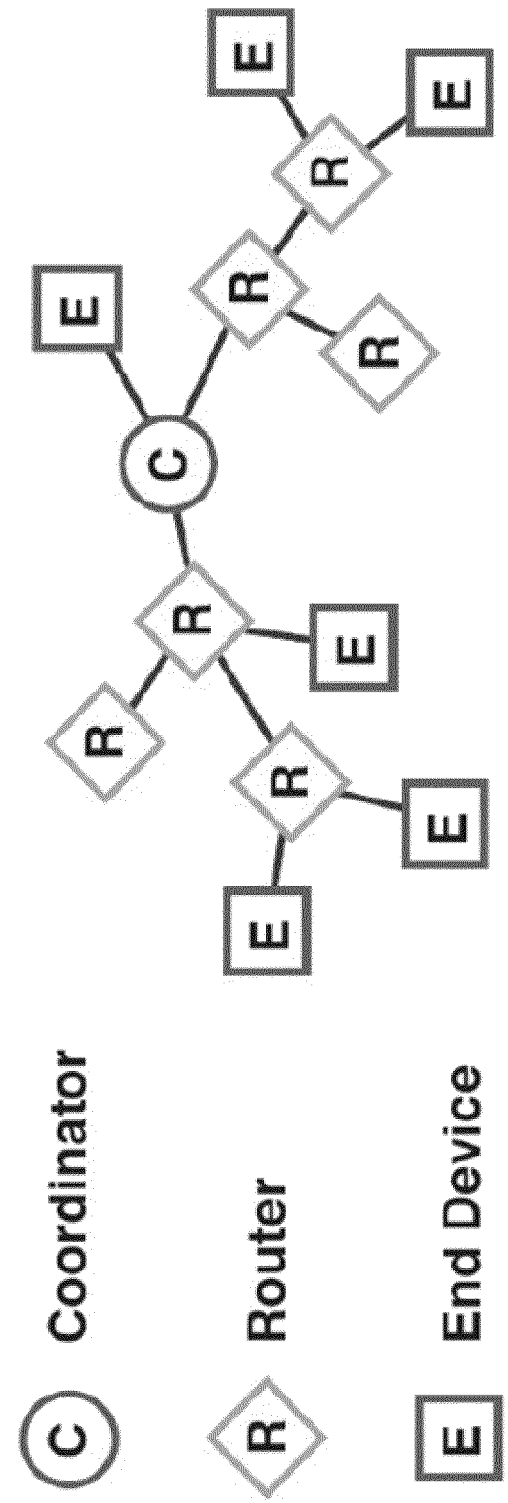
FIG. 2 shows an exemplary NAN structure illustrating aspects of the present disclosure.

A typical NAN structure is shown in FIG. 2, where the Node C is a coordinator or collector node and Nodes R and E correspond to sensor nodes (meters) with routing and endpoint capabilities respectively. The complexity of the routing nodes and the endpoint nodes is similar, but a routing node has more intelligence, and is able to route packets between nodes. The coordinator node (or a data sink) could be also of similar complexity to a routing node or an endpoint node, but has the capability of implementing more functions. Generally, each NAN structure has one coordinator node. The coordinator node generally is connected to an AP and the APs are interconnected using a mesh or other topology to constitute the overall network. The APs may be controlled by a central server, which as a result has an overall view of the whole network.

Figure 3:
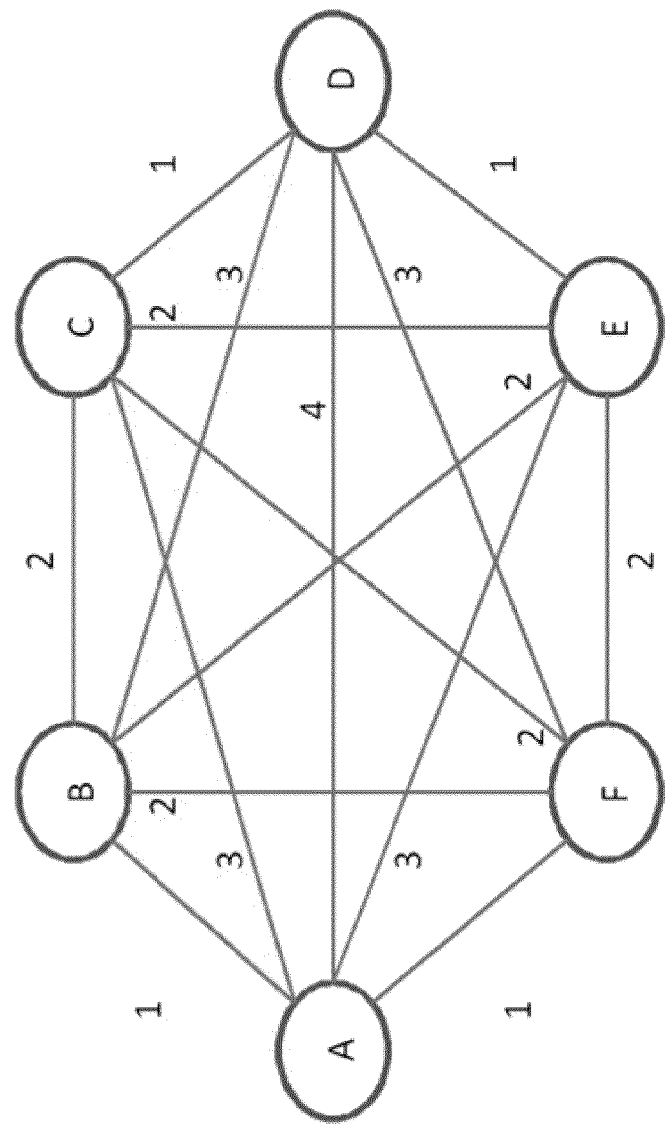
FIG. 3 shows the exemplary WSN or NAN structure having six nodes, designated A through F illustrating aspects of the present disclosure.

In an embodiment the WSN topology corresponds to a NAN as depicted in FIG. 3 represents, for example, a cluster of homes with wireless-enabled electric, gas, water, and other meters. Since the number of such meters could be large, the cost-effectiveness of the overall network may be very important consideration. This requires that the ratio of sensor nodes to the coordinator nodes (with a one to one relationship between coordinator nodes and access points) be maximized.

The WSN or NAN structure in FIG. 3 has six nodes, corresponding to six homes in our example, designated A through F. The numbers 1, 2, 3, etc. denote the weights of a link connecting the adjacent nodes. The weight 1 denotes the distance between Node A and Node B (say in the range of 100 m-200 m). Weight 2 corresponds to a distance of 200 m-300 m, and similarly, weight 3 corresponds to a distance of 300 m-400 m, and so on.

We assume that there is a certain minimum power level required to bridge the distance between intercommunicating nodes. For example, the minimum power level to bridge the distance between nodes in the range of 100 m-200 m could be 1 mW, or 0 dBm. The minimum power level required for nodes in the range of 200 m-300 m could be 4 mW, or 6 dBm, and so on. Additionally, the power level required to bridge the distance between nodes is assumed to include the effects of noise, interference, and other impairments.

In FIG. 3, Node A is assumed to be the coordinator location and is part of the sensor network and has its own sensors. In our example, the Node A can communicate with Node D directly, or through Nodes B and C. The advantage of communicating through Nodes B and C is that each node needs to bridge a smaller distance along this path. If the range of A was such that it was less than the distance corresponding to A to D, routing through B and C effectively results in range extension.

Figure 4:
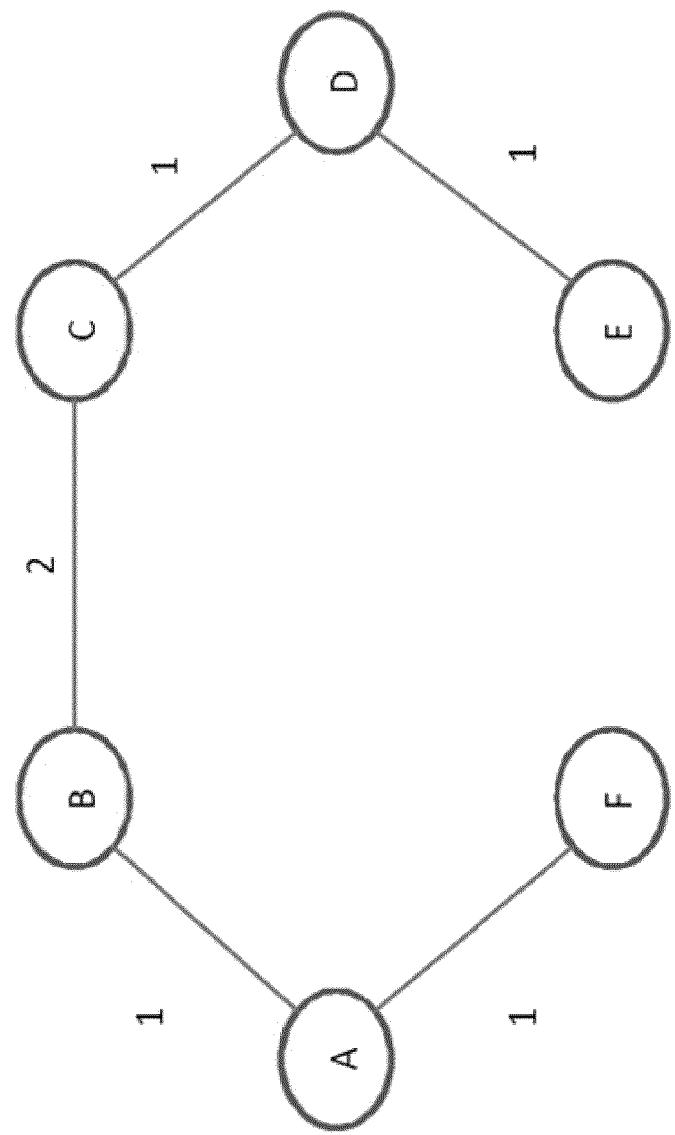
FIG. 4 shows an example spanning tree of a network.

If Node A's range was limited to a distance of say 400 m (3 units on the graph), only Nodes A, B, C, E, and F would be included in the cluster controlled by the coordinator located at A. However, by routing packets through B and C, Node D can be also included in the same cluster. With this approach, the ratio of sensor nodes to coordinator nodes is 6 sensor nodes (Nodes A-F) to 1 coordinator node (Node A), as opposed to 5 sensor nodes (Nodes A, B, C, E, and F) to 1 coordinator node (Node A). If we assume a one-to-one correspondence between a coordinator node and an AP, the reduced topology of FIG. 4 is more cost-effective as the ratio of sensor nodes to AP is larger.

The NAN structure in FIG. 3 is quite simple and thus cost optimization can be done manually through simple observation. However, to automate this process to deal with random and complex NAN topologies, an algorithm is required for this cost optimization. Our approach maps this cost optimization problem to an algorithm to determine the overall minimal cost spanning tree for a weighted graph. Kruskal's Algorithm represents the most suitable approach for optimizing the cost of a NAN structure consisting of mesh-connected meters or sensor nodes.

Kruskal's Algorithm takes a weighted graph and determines its minimum weight spanning tree by selecting the graph's edges in nondecreasing order of weight. Our COMPUTER implementation of generating the minimum spanning tree for any WSN corresponding to a NAN begins with randomly deploying N nodes in a bounded area. Next, the program maps the distances between nodes to the minimum required power levels for pair-wise node communication. The links of the network are ordered in nondecreasing order of minimum required power for node communication into a $$\frac{N^2 - N}{2} - by - 2$$

matrix, where the number of rows in the matrix is the number of links available.

The algorithm begins with a subgraph that consists of no vertices or edges. The subgraph is enlarged incrementally by considering links based on their order in the sorted matrix. We choose a specific link only if at least one of the nodes is not an element of the current subgraph. After each node is involved in at least one link, the algorithm determines if the current subgraph is connected, ensuring that each node has a path to every other node in the NAN. If not, the algorithm chooses the remaining links incrementally to ensure that there is no longer any isolated node. Recall that a spanning tree will have N−1 links, which is a termination criterion for the algorithm.

It should be noted that our optimization approach is not dependent on the exact location of the AP. Any node may arbitrarily be designated to be the AP, simplifying overall organization of the NAN from an installation and maintenance point of view. The AP location can be chosen keeping in mind the proximity to the rest of the infrastructure.

As explained in present disclosure, the ratio of the number of sensor nodes to that of APs can be can be maximized by judiciously choosing certain sensor nodes to route information to other nodes to accomplish range extension. We also noted that Kruskal's Algorithm is used in create a minimum spanning tree where weights correspond to the distances between node pairs. The topology resulting from the application of Kruskal's Algorithm facilitates the choice of the routing nodes and the resulting NAN structure operates in a multi-hop mode in such a way that the links utilized are of minimum distance and the network is connected.

As noted earlier, the algorithm was implemented using a computer program. Embodiments illustrate the result by inputting the NAN structure in FIG. 3. The input matrix is shown in FIG. 5. The element in Row i and Column j of the matrix indicates the distance between Node i and Node j. For example, the element in Row 1 and Column 6 is 1 as Node A and Node F are 100 m-200 m apart. It is to be noted that this is a symmetric matrix. This matrix is used as an input to the computer program and that results in the matrix of links of the optimized topology (depicted in FIG. 4) as shown in FIG. 6. The program, which is based on Kruskal's Algorithm, can be verified by creating a large number of NAN structures where the nodes in each structure are assumed to be randomly located in a bounded area.

Figure 7:
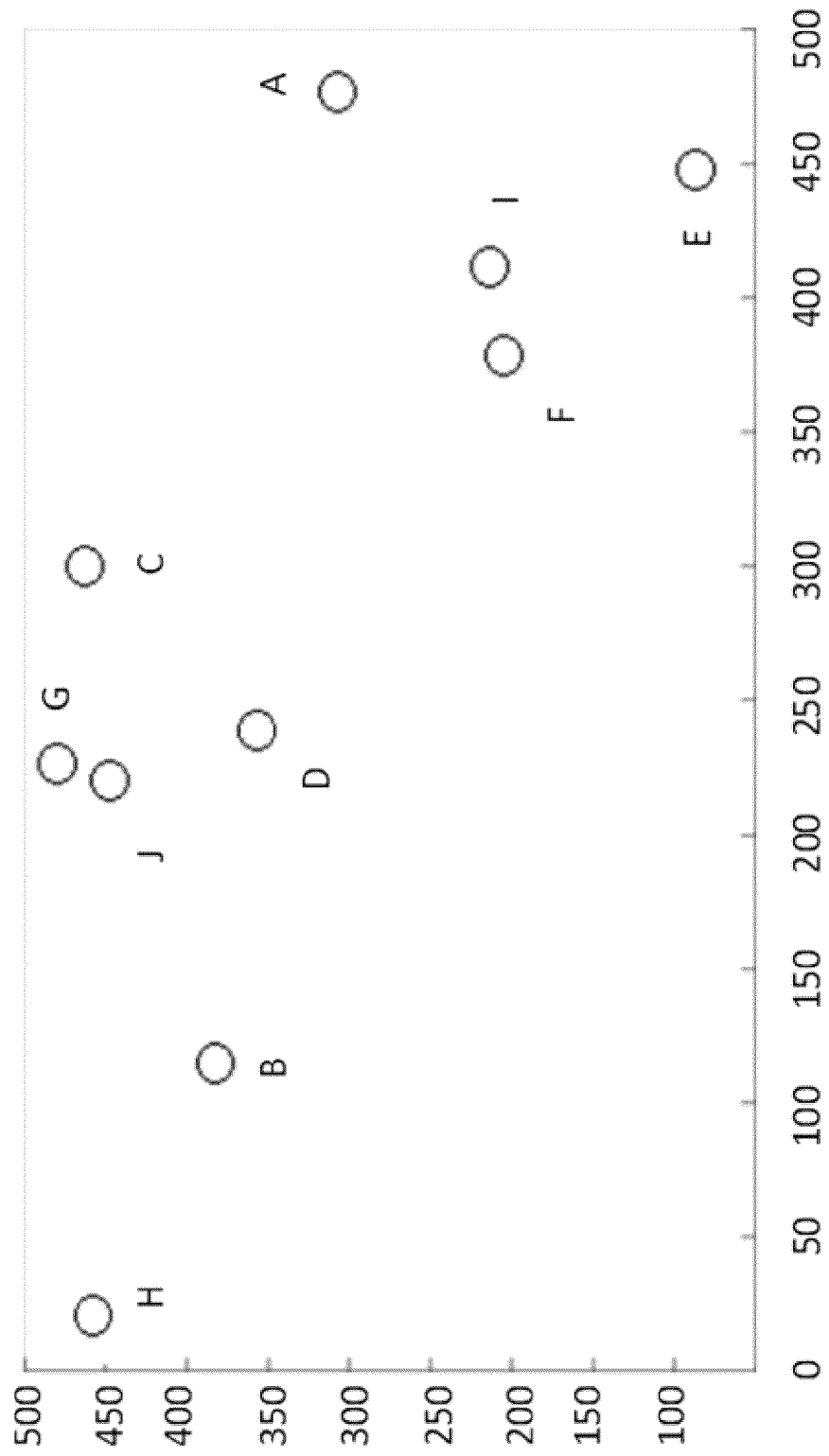
FIG. 7 shows an exemplary random topology generated of a 10-Node network in a region of dimensions 500 m×500 m illustrating aspects of the present disclosure.

FIG. 7 shows a random topology generated by a computer program of a 10-Node network in a region of dimensions 500 m×500 m implementing an embodiment of the present disclosure. FIG. 8 shows the matrix of distances mapped to the weights on the graph. As before, let us assume that a weight 1 against an edge implies that the distance between the two incident nodes (two homes) is in the range of 100 m-200 m, weight 2 corresponds to 200 m-300 m, and so on. Further, FIG. 9 shows the final tree structure of the optimized topology.

It can be determined that without the optimization step similar to the one proposed in this disclosure, the range of each sensor node would have to be a lot higher to include all 10 nodes in one NAN cluster. If A is the AP (also the coordinator node), the range of the sensor node at A has to be 400 m to 500 m in order to communicate directly with its most distant node, Node H, as shown in FIG. 8. Implementing embodiments, the range needed is only 200 m-300 m (the link between A and C), and thus more sensor or meter nodes are included in the cluster for a given power level of each node (power level of weight 2 only), reducing the number of APs needed in the overall network.

Figure 9:
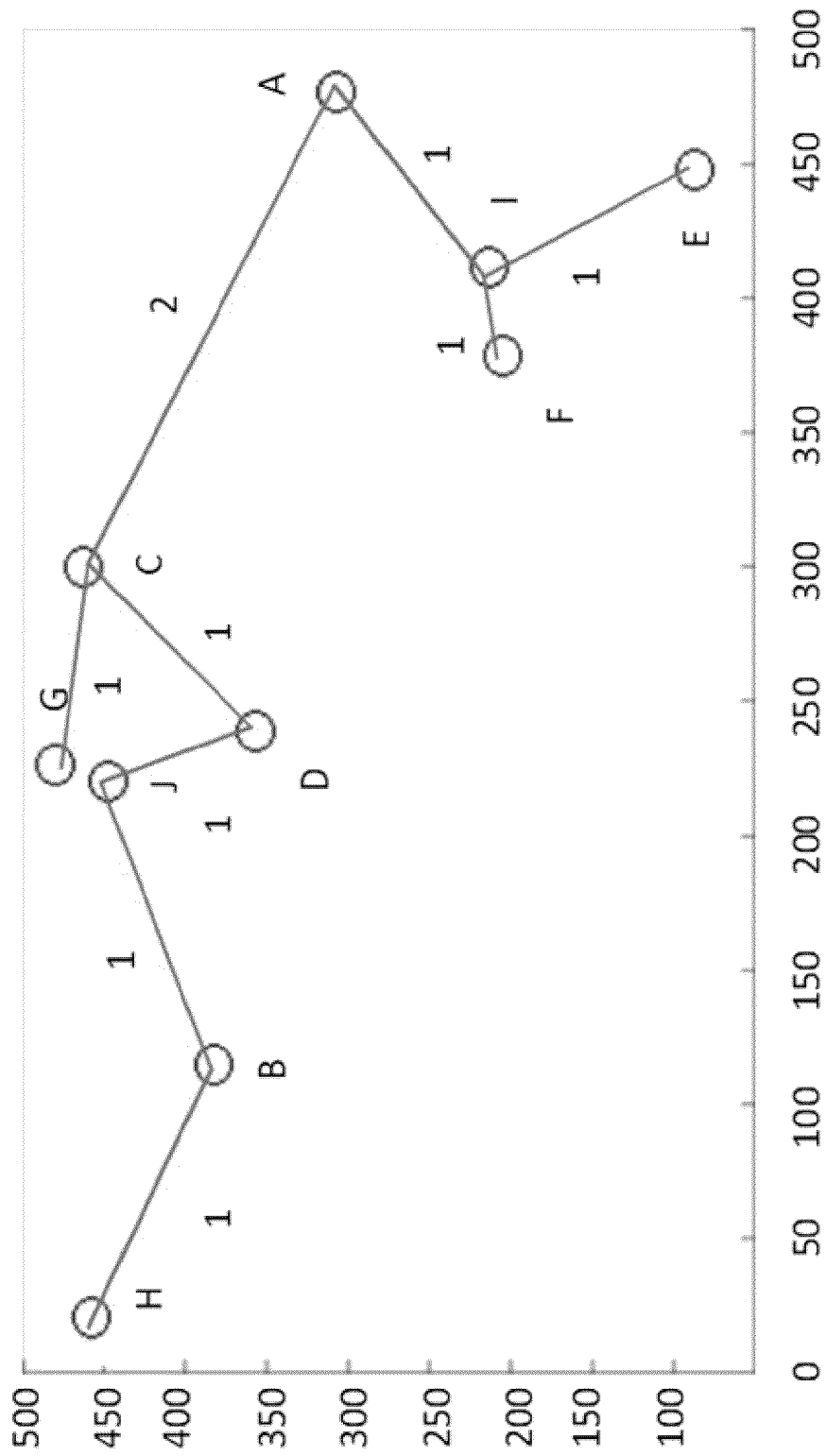
FIG. 9 shows an exemplary tree structure of the optimized topology graph illustrating aspects of the present disclosure.

Referring to FIG. 9, the spanning tree structure resulting from the application of Kruskal's Algorithm, show there is only one path between each pair of nodes.

A computer program is structured in such a way that it outputs the location of the routing nodes of the network and the power required for communication between each node pair in the NAN. This information can be used to determine the location of "dummy" or repeater nodes to expand the size of a NAN, thus further increasing the ratio of sensor nodes (meters) to gateways or APs.

Figure 10:
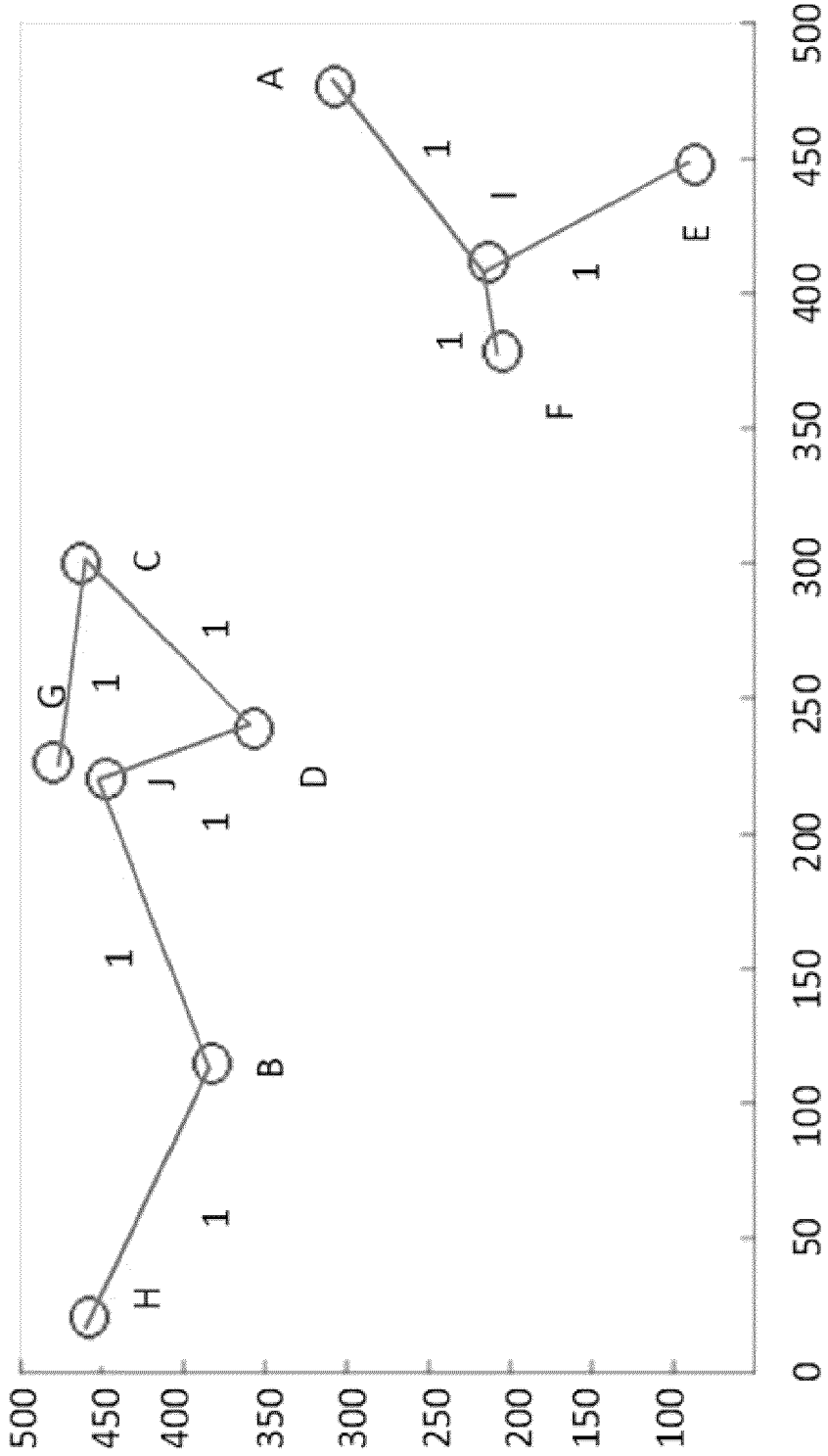
FIG. 10 shows an exemplary two-cluster NAN topology illustrating aspects of the present disclosure.
Figure 11:
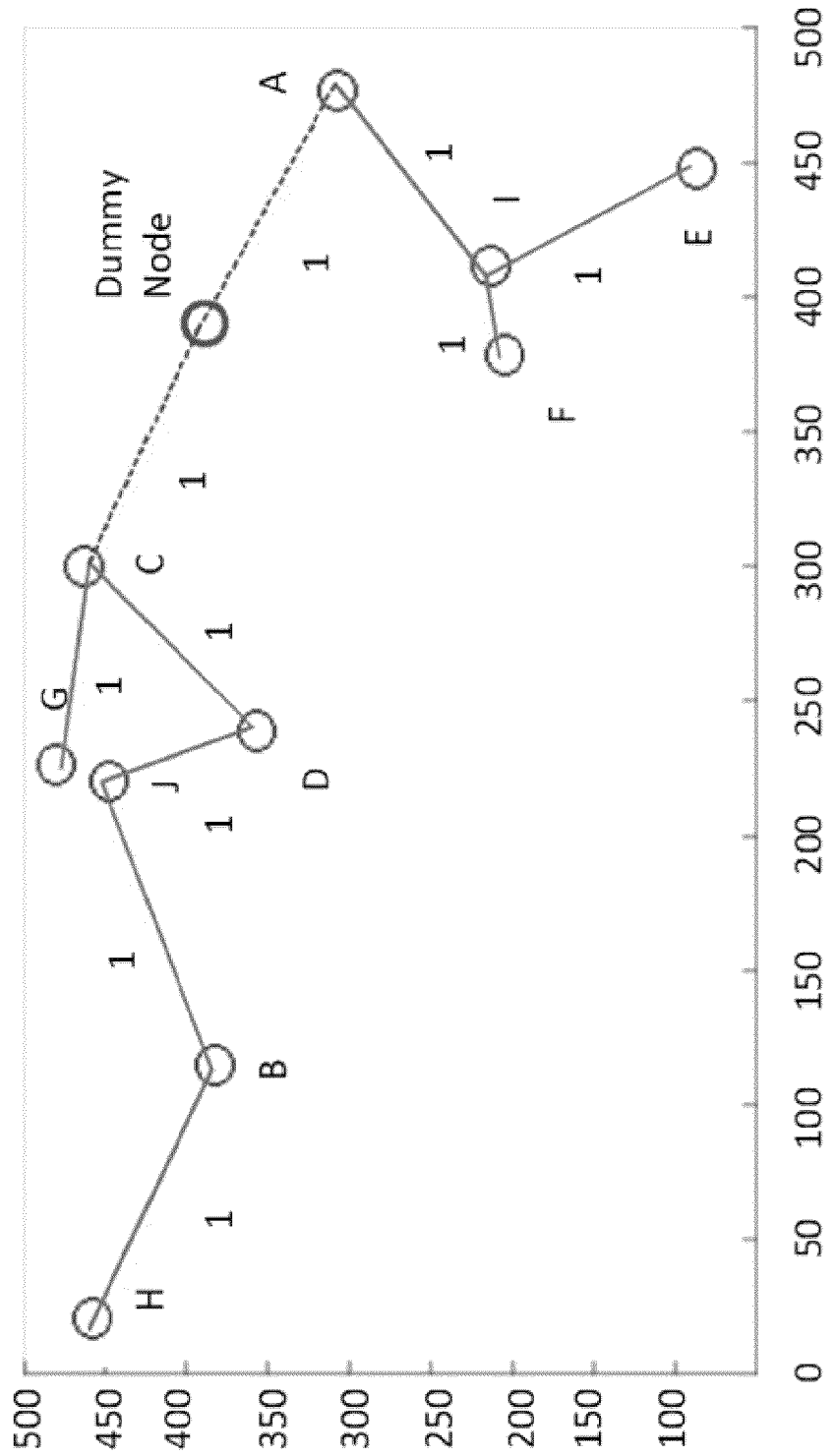
FIG. 11 shows an example dummy node placed between Node A and Node C illustrating aspects of the present disclosure.

Referring to FIG. 10, the maximum distance a routing sensor node can bridge corresponds to a range of 100 m-200 m, the topology in FIG. 10 corresponds to two clusters: (1) which includes A, F, E, and I and (2) which includes B, C, D, G, H, and J. These two clusters can obviously be bridged to form a single cluster by inserting a dummy or relay/repeater node in the middle of the link interconnecting Nodes A and C, as shown in FIG. 11. This approach can be generalized to expand the size of clusters and thus further increase the ratio of the number of sensor nodes to that of APs. In actual applications, a single AP could be used to control hundreds of sensor nodes using our approach. Thus, if the maximum range of the routing nodes is specified, a computer program implementing Kruskal's Algorithm includes this bridging procedure to automate the overall optimization process.

Figure 12A:
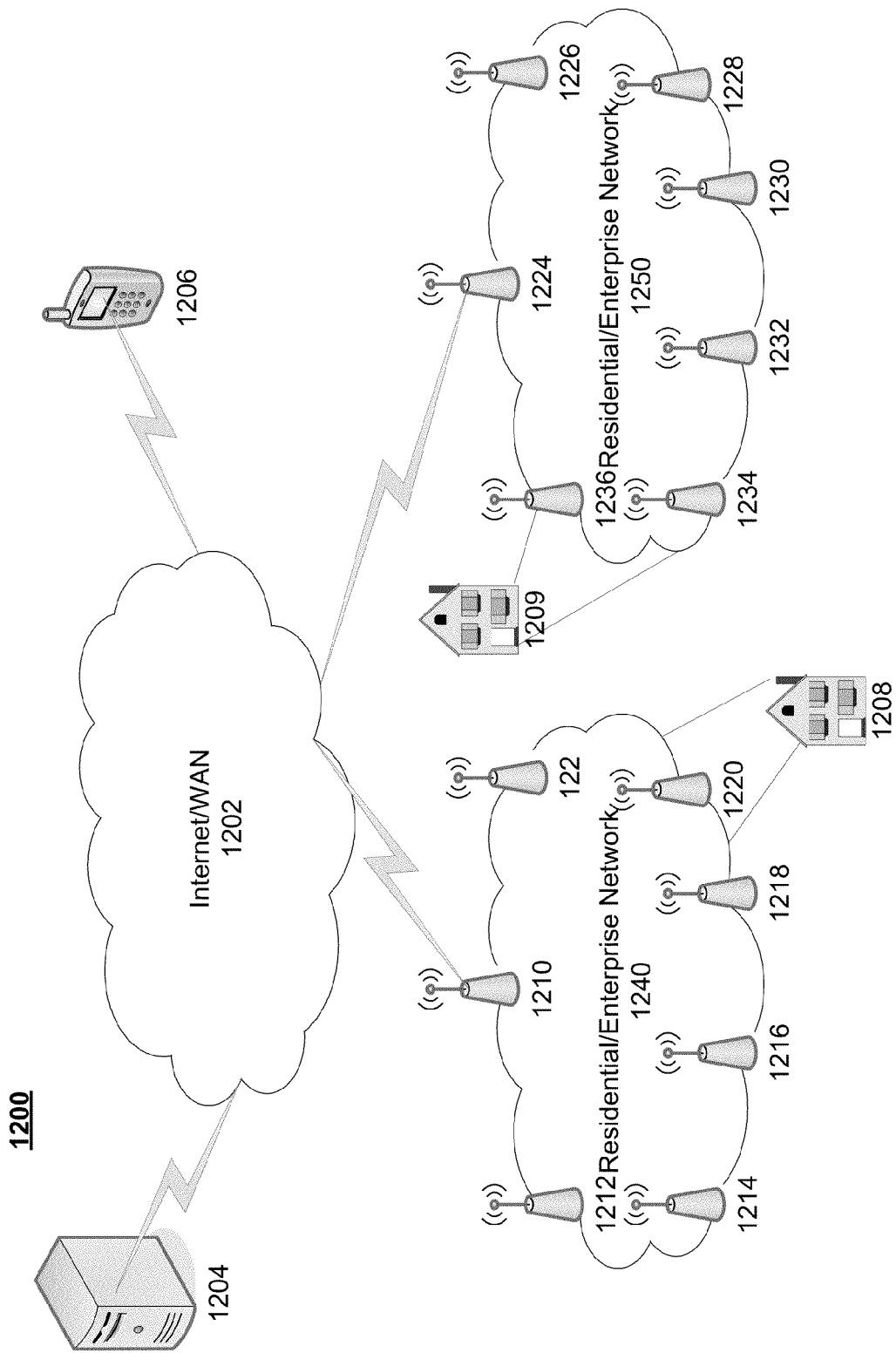
FIGS. 12A and 12B are exemplary networks of a wireless sensor network that illustrates aspects of the present disclosure.

FIG. 12A is exemplary network 1200 of a wireless sensor network(s) (1240 and 1250) that illustrates aspects of the present disclosure. The network 1200 includes two wireless sensor networks or NANs (1240 and 1250) each associated with a different residence or business (1208 and 1209) as part of an advanced metering infrastructure. Persons of ordinary skill in the art would understand that other embodiments may include a single wireless network or three or more wireless networks. Each wireless network (1240 and 1250) may have one or more wireless sensors or meters (1210-1222 and 1224-1236). One wireless sensor or meter in each wireless sensor network (1240 and 1250) may be an access point sensor (1210 and 1224). The access point sensor may have management and/or control software to manage and control the other wireless sensors (1212-1222 and 1226-1236). Further each access point sensor (1210 and 1224) may be coupled to a communication network 1202 such as the Internet or a Wide Area Network (WAN). In addition, a remote computer server 1204 and/or a client computing device 1206 may be coupled to the communication network 1202. The remote computer server 1204 and/or the client computing device 1206 may remotely manage and control the wireless sensors (1210-1236) in the wireless sensor networks (1240 and 1250). Although FIG. 12A shows the client computing device 1206 to be a smartphone, persons of ordinary skill in the art would recognize that in other embodiments the client computing device 1206 may be a mobile phone, tablet computer, laptop computer, desktop computer or any other type of client computing device known in the art.

In an embodiment, the wireless sensors or sensors (e.g. metering) nodes (1212-1222 and 1226-1236) are under the control of an access point sensor (1210 and 1224). The access point sensor is coupled to a communication network 1202 and the access point sensor or meter (1210 and 1224) can be managed and controlled by a remote server. The sensor nodes (1210-1222 and 1224-1236) may be randomly located in a bounded area and in one embodiment the wireless sensors (1210-1222 and 1224-1236) may control the total power consumption of the sensor nodes (1210-1222 and 1224-1236), including that of the access point sensor (1210 and 1224) such that the total power consumption of the wireless sensors (1210-1236) is reduced. This is because the wireless sensors (1210-1236) may be distributed over a wide area, including in locations which are not easily accessible. Thus, the number of sensors and the type of sensors could be large and varied, especially in industrial applications. In one embodiment, the nodes (1210-1236) of the sensor or metering network may be used, among other things, for observation and control of elements like thermostats, electrical outlets, electric meters, etc. in an energy management system. Other embodiments may include other applications such as reading water/gas meters, control of security cameras and motion sensors, etc.

Several conventional techniques for power conservation or cost optimization of wireless sensor nodes involve a game-theoretic framework. Alternatively, the pending disclosure describes a graph-theoretic approach such that in a wireless sensor network, sensor nodes are designated as either a routing node or an endpoint node. In one embodiment, a wireless metering node may consume a certain level of power regardless of whether the wireless sensor node is a routing node or a sensor node. A parameter that significantly affects power consumption of a sensor node is power level of a sensor's transmitter, a needed transmitter power level being a function of the distance the sensor node is required to bridge to communicate with a destination node.

In such an embodiment, in order to ensure that overall power consumption of the nodes in the wireless is minimal, sensor nodes and the links interconnecting all of the node pairs may be designated as a set of vertices and edges of a weighted graph to obtain the minimum spanning tree. A graph theoretic algorithm such as Kruskal's algorithm or Dijkstra's algorithm, may be used to generate the minimum spanning tree considering edges in nondecreasing order of weight, which may represent the power level required for the two incident nodes to communicate. The power level required to bridge the distance between nodes may include the effects of noise, interference, and other impairments. The overall power consumption of a wireless sensor network (WSN) can be minimized by designating certain sensor nodes to route information to other sensor nodes based on node proximity. The topology resulting from the application of such graph theoretic algorithms facilitates the choice of the routing nodes and the resulting WSN structure operates in such a way that each node is set at the minimum power level possible, thus reducing the overall power consumption of the WSN.

Note, in the present disclosure, the term sensor and meter as well as sensor node and metering node may be used interchangeably.

Figure 12B:
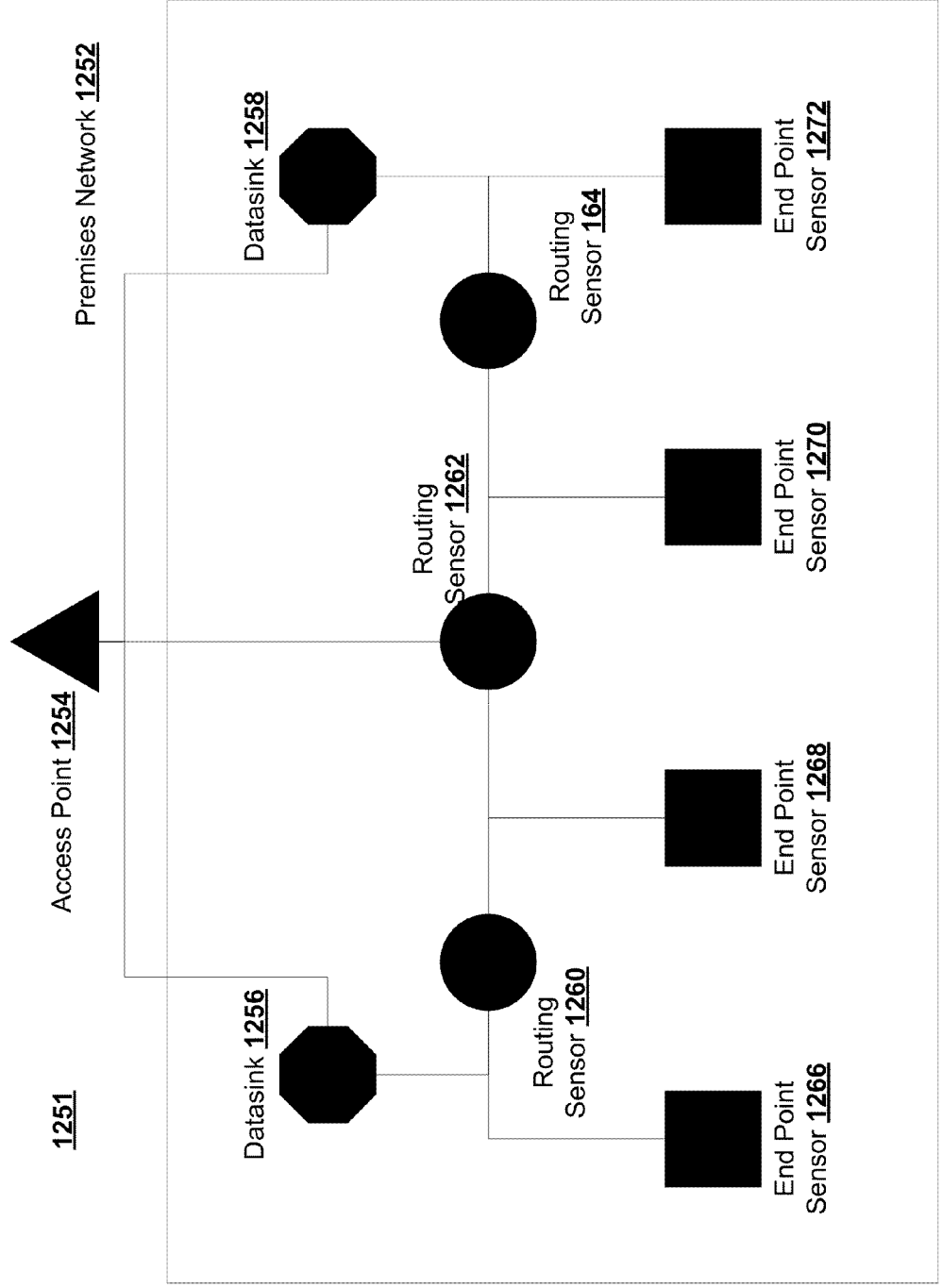

FIG. 12B is exemplary network 1251 of a wireless sensor network 1252 that illustrates aspects of the present disclosure. The exemplary network includes several end sensors (1266-1272), several routing sensors (1260-164), several datasinks or coordinators (1256-1258) and an access point 1254. Wireless sensor network 1252 may perform one application and perform a mix of applications. In one embodiment, each sensor (1260-1272) in the wireless sensor network 1252 may be a meter that is part of a power metering system for the premises. In another embodiment, some of the sensors may be metering sensors while others are temperature sensors. Thus, a third party provider may gather information from and then manage the sensors accordingly.

Each of the end point sensors (1266-1272) may be located in a portion of the premises and gathers information (e.g. electric meter, gas meter, temperature meter, etc.). An end point sensor (1266-1272) may be coupled wirelessly to one or more routing sensors (1260-1264). Routing sensors may have the same capability as end point sensors in terms of gathering information (e.g. motion, temperature, etc.). However, in addition to such capability, each routing sensor may receive information from one or more endpoint sensors as well as its own gathered information and transmit the sensor information to one or more datasinks (1256-1258) or the access point. Further, an end point sensor may also transmit gathered information to the one or more datasinks (1256-1258). In addition, the datasinks (1256-1258) may query the end point and routings sensors for information. Datasinks (1256-1258) gather information from the endpoint and routing sensors then process and manage the gathered information. Such functions performed by the datasink (1256-1258) may be referred to as data coordination. Further information collected may include network or subnetwork status information. Once information is gathered and possibly processed and the end point and routing sensors are managed, the datasink transmits the gathered information including network and subnetwork status information to the access point 1254 for further processing or forwards to a remote computer server. The access point 1254 may receive the information from the datasinks (1256-1258) as well as the routing sensors (1260-1262). In other embodiments, end point sensors (1266-1272) may be able to transmit gathered information to the access points 1254 directly. The devices shown in FIG. 12B including the access point 1254, datasinks (1256-1258), routing sensors (1260-1264) and end point sensors (1266-1272) may be coupled to each other wirelessly, wired, a mix of wireless and wired, or any other coupling mechanism known in the art. Further the access point may forward the gathered information including the network and subnetwork status information to a remote server or a remote computing device that may then reconfigure the sensor network. Such a reconfiguration may include configuring endpoint nodes to routing nodes and routing nodes to endpoint nodes. Note, the term nodes, sensors and meters may be used interchangeably in the present disclosure.

Figure 13:
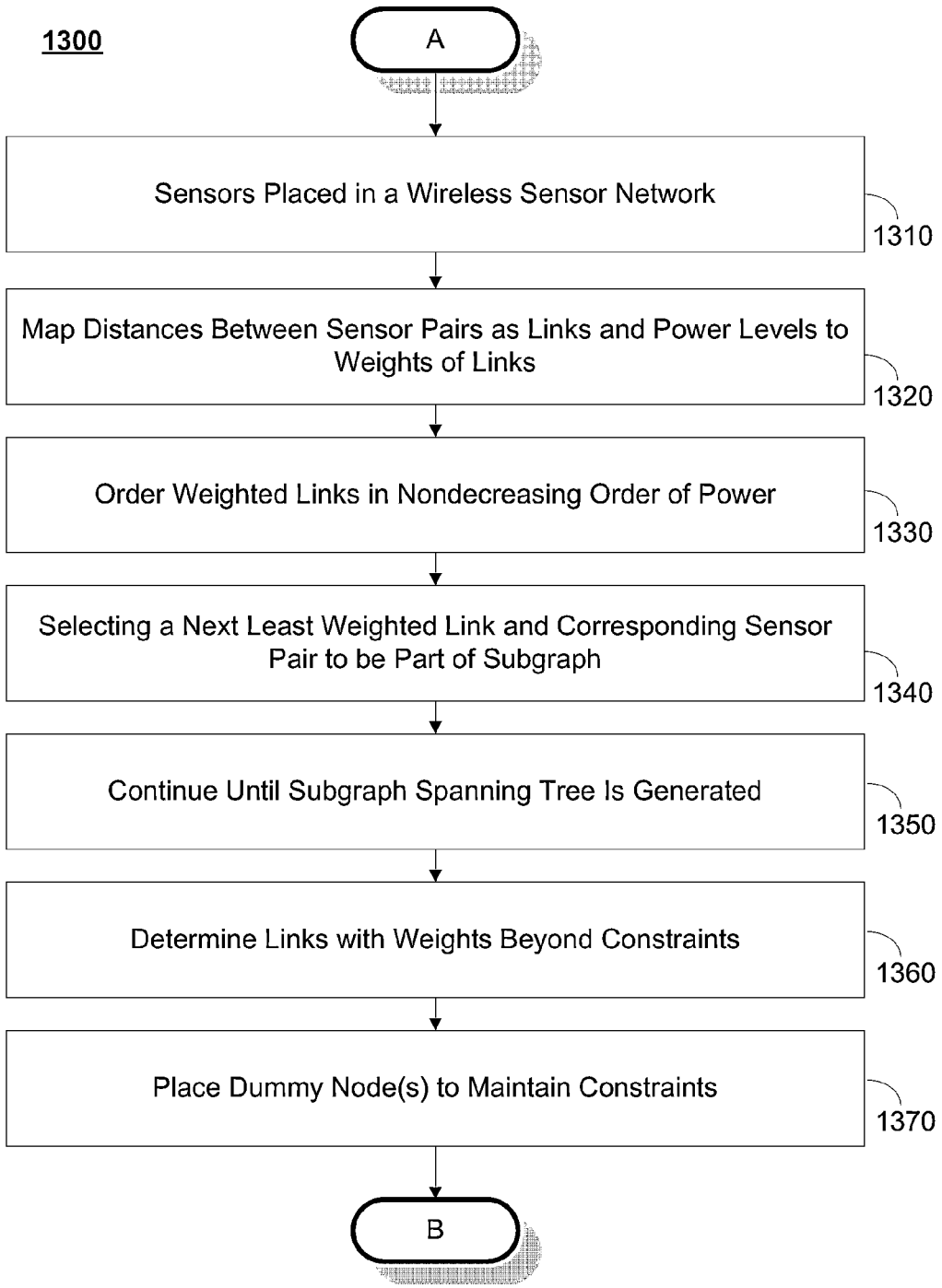
FIG. 13 is an exemplary flow chart showing an example method that is an aspect of the present disclosure.

FIG. 13 is an exemplary flow chart 1300 showing an example method that is an aspect of the present disclosure. The flow chart 1300 may incorporate Kruskal's algorithm. A step in the example method may be placing sensors in a wireless sensor network (WSN), as shown in block 1310. The placement and location for each sensor in the WSN may be inputted to an access point, remote computer server or client computing device using known methods in the art. For example, a user may input the location using a user interface in the client computing device. Alternatively, there may be geolocation software applications on each sensor such that each sensor is able to determine its location and then transmit such location to the access point, remote computer server, or client computing device.

A further step in the example method may be mappings distances between sensor nodes in the WSN to the minimum required power levels for pair-wise node communication using software and/or hardware to detect the distance between sensor nodes, as shown in block 1320. Alternatively, a user may enter the distances between sensor nodes using the user interface of the client computing device. Another step may be software application on the access point, remote computer server, or client computing device orders the links of the network in nondecreasing order of minimum required power for node communication into a $(N^2-N)/2$ by 2 matrix, where the number of rows in the matrix is the number of links available in the WSN, as shown in block 1330.

An additional step in the example method selecting a specific link only if at least one of the nodes is not involved in the current subgraph, as shown in block 1340. A further step in the method may be that after each node is involved in at least one link, the algorithm determines if the current subgraph is connected, ensuring that each node has a path to every other node in the WSN, as shown in block 1350. If each node does not have a path to every other node in the WSN, then the algorithm chooses the remaining links incrementally to ensure that there is no longer any isolated component. Such a spanning tree should have N−1 links and can be a termination criterion for the algorithm when implemented by the software application. Further, the software application may output the routing nodes of the network and the total power required for communication among the nodes in the WSN.

Another step in the example method may be determining links in the spanning tree with weights that are beyond the constraints. For example, the spanning tree presents a link with a weight equal to 2 when the weight constraint is equal 1. An additional step may be placing one or more dummy nodes along such a link to maintain the weight constraint. For example, a link may have weight equal to 2. A dummy node may be place halfway across the link such that the link becomes two links coupled by the dummy node. Further, each of the two links coupled to the dummy node both have a weight equal to 1 to maintain the weight constraint. Placing of the dummy nodes may maximize the ratio between sensor nodes and access points.

Embodiments of the disclosure may not be dependent on the exact location of the AP node. Any node may arbitrarily be designated to be the AP node, simplifying overall organization of the WSN from an installation and maintenance point of view. In addition, the AP node location can be chosen keeping in mind the proximity of a node to the wired infrastructure.

As discussed previously, overall power consumption of a WSN can be reduced choosing certain sensor nodes to route information to other nodes based on node proximity. Further, Kruskal's Algorithm can be used to generate a minimum spanning tree where weights correspond to the power level required for a node pair to communicate. The spanning tree resulting from the application of Kruskal's Algorithm facilitates the choice of the routing nodes and the resulting WSN structure operates in such a way that each node is set at the minimum power level possible, thus minimizing the overall power consumption of the WSN.

Figure 14:
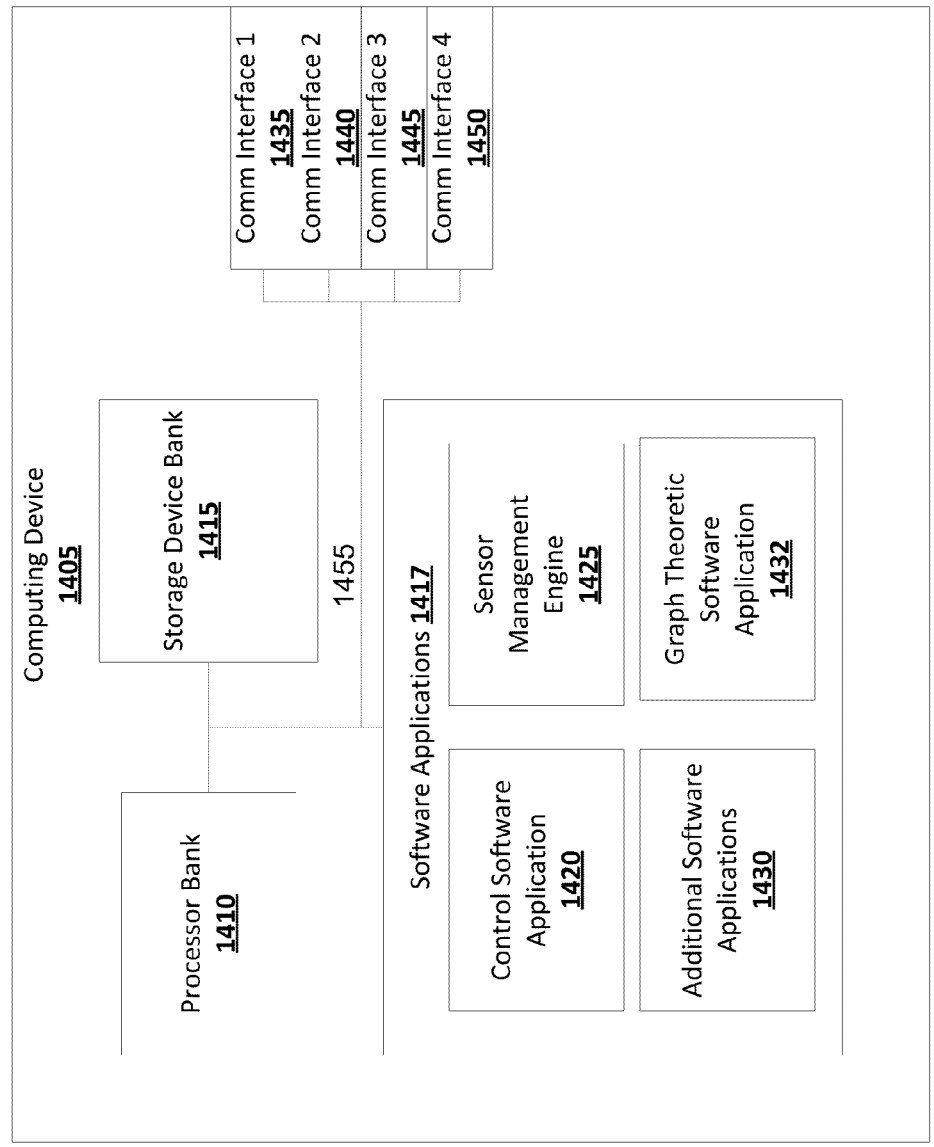
FIG. 14 is an exemplary functional block diagram of a computing device that may be used in as part of an aspect of the disclosure.

FIG. 14 is an exemplary functional block diagram of a computing device that may be used in as part of an aspect of the disclosure. The computing device may be an access point (or any sensor node), remote computer server, or client computing device used to configure, designate or determine one or more routing nodes or end point nodes in a wireless sensor network. A client computing device may be a smartphone, mobile phone, tablet computer, laptop computer, desktop computer or any other computing device.

The computing device 1405 may include several different components such as a processor bank 1410, storage device bank 1415, one or more software applications 1417, and one or more communication interfaces (1435-1450). The processor bank 1410 may include one or more processors that may be co-located with each other or may be located in different parts of the computing device server 1405. The storage device bank 1415 may include one or more storage devices. Types of storage devices may include memory devices, electronic memory, optical memory, and removable storage media. The one or more software applications 1417 may include control software applications 1420, a sensor management engine 1425, additional software applications 1430, and graph theoretic software application 1432. The control software applications may implement software functions that assist in performing certain tasks for the computing device 1405 such as providing access to a communication network, executing an operating system, managing software drivers for peripheral components, and processing information. The additional software applications may include software drivers for peripheral components, user interface computer programs, debugging and troubleshooting software tools. The graph theoretic software application 1432 receives as input a wireless sensor network topology and can apply one or more graph theoretic algorithms to determine a spanning tree to conserve overall power consumption of the wireless sensor network. The sensor management engine 1425 receives the spanning tree determined by the graph theoretic algorithm and then remotely configures the individual sensor nodes of the WSN to be either an access point sensor node, routing nodes, and endpoint nodes. Specifically, the graph theoretic software application 1432 receives the wireless sensor network topology using known techniques in the art. For example, the location of each node may be inputted using the user interface into the computing device 1405 and relayed to the graph theoretic software application 1432. Other examples may include the sensor nodes having geolocation capability to determine their location and transmitting their location to the computing device 1405 across a communication network. Further, the graph theoretic software application 1432 may implement an algorithm that includes selecting a link that couples a node pair and a node can be an access point, routing sensor, or endpoint sensor. In addition, the graph theoretic software application 1432 may map the distance between the selected node pairs to a corresponding bridging power level such that the bridging power level between a node pair is designated as a weight of the link. Persons of ordinary skill in the art understand that bridging power level may be one embodiment of the present disclosure and that a weight of a link may correspond to other link attributes such as bandwidth/capacity, cost, similarity or difference of a nearest neighboring node, etc. and other applications known in the art. The graph theoretic software application 1432 may also rank the weighted links for each corresponding node pair in nondecreasing order of weight and then select a next least weighted link and corresponding node pair as part of a subgraph. The graph theoretic software application 1432 may repeat the selecting of the next least weighted link and corresponding node pair as part of the subgraph until every node is part of the subgraph and generates a spanning tree.

Further, in one embodiment, the sensor management engine 1425 may receive the spanning tree from an intra-device link 1455. Further, sensor management engine may determine which sensor nodes in the WSN have been designated routing nodes and which have been designated as endpoint nodes. The computing device 1405 is coupled to one or more sensor nodes in the WSN across one or more communication networks. Thus, based on the spanning tree information, the sensor management engine may configure the one or more sensor nodes as routing nodes or endpoint nodes using command messages.

Further, the sensor management engine 1425 receive sensor information from the routing nodes or the endpoint nodes and process the sensor information to generate sub-network information and transmit the sensor information and the sub-network information to another computing device. Thus, based on network and subnetwork information (e.g. status information), the sensor management engine may reconfigure the one or more sensor nodes as routing nodes or endpoint nodes using command messages.

For example, the routing and endpoint nodes may provide the sensor management engine with the remaining battery life of each node. Further, the sensor management engine 1425 may process such battery life information and determine that the remaining battery life of a specific node is below a threshold. Thus, the sensor management engine 1425 may command the graph theoretic software application to apply Dijkstra's algorithm to the WSN using the specific node as the root node. In addition, the sensor management engine 1425 may receive the resulting spanning tree from applying Dijkstra's algorithm and reconfigure the sensor nodes with different nodes being routing nodes and endpoint nodes.

Each of the communication interfaces (1435-1450) shown in FIG. 14 may be software or hardware associated in communicating to other devices. The communication interfaces (1435-1450) may be of different types that include a user interface, USB, Ethernet, WiFi, WiMax, wireless, optical, cellular, or any other communication interface coupled to communication network.

An intra-device communication link 1455 between the processor bank 1410, storage device bank 1415, software applications 1425, and communication interfaces (1430-1445) may be one of several types that include a bus or other communication mechanism.

In the present disclosure, an elegant approach to reducing the cost of an Advanced Metering Infrastructure by increasing the ratio of the number of sensors/meters in a Neighborhood Area Networks to the number of APs or gateways is described. The approach maps this cost optimization problem to an algorithm to determine the overall minimal cost spanning tree for a weighted graph. Kruskal's Algorithm is used to create a minimum spanning tree that increases the size of a NAN.

The sensor nodes or meters are assumed to be wireless-enabled and might use a commercially available wireless controller. In our model, the remote server and the collector node combination can program the nodes or meters to be either an endpoint or a routing node.

The topology resulting from the application of Kruskal's Algorithm determines the choice of the routing nodes and the resulting NAN structure operates in such a way that each node is required to use a minimum-distance link to communicate with other nodes. We have also proposed a scheme for expanding the NAN structure size to include more sensor nodes by inserting "dummy" nodes between disconnected NAN structures, further increasing the ratio of sensor nodes to APs. This modification obviously further reduces the cost of the AMI.

As explained in the present disclosure, the approach for cost optimization is algorithmic, while the current implementations rely on ad-hoc approaches. While the discussion has been focused on optimizing the cost of a NAN (or WSN) structure consisting of a meshed array of meters (or sensor nodes), the algorithm is also applicable in minimizing the cost of the meshed backhaul network which interconnects the access points (AP) to each other and to the central server as illustrated in FIG. 1.

The foregoing is illustrative only and is not intended to be in any way limiting. Reference is made to the accompanying drawings, which form a part hereof. In the drawings, similar symbols typically identify similar components, unless context dictates otherwise.

Note that the functional blocks, methods, devices and systems described in the present disclosure may be integrated or divided into different combination of systems, devices, and functional blocks as would be known to those skilled in the art.

In general, it should be understood that the circuits described herein may be implemented in hardware using integrated circuit development technologies, or yet via some other methods, or the combination of hardware and software objects that could be ordered, parameterized, and connected in a software environment to implement different functions described herein. For example, the present application may be implemented using a general purpose or dedicated processor running a software application through volatile or non-volatile memory. Also, the hardware objects could communicate using electrical signals, with states of the signals representing different data.

It should be further understood that this and other arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions, or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed:

1. A system for managing cost in a wireless enabled advanced metering infrastructure, the system comprising:
   (a) a remote server;
   (b) a wide area network coupled to the remote server;
   (c) one or more access points coupled to the remote server through the wide area network,
   (d) at least one neighborhood area network that includes one or more wireless enabled meters;
   (e) one or more datasink nodes wherein each datasink node is configured to have a datasink function, to be a data coordinator, to receive metering information from the one or more wireless enabled meters, to process metering information, and to transmit metering information to at least one access point;
   (f) wherein each wireless enabled meter is configured to be a node, wherein the node is at least one of a routing node and an endpoint node;
   (g) wherein a first set of wireless enabled meters are configured to be one or more routing nodes and a second set of wireless enabled meters are configured to be one or more end point nodes based on a graph theoretic algorithm and each wireless enabled meter is set to a minimum power level based on a bridging distance to a neighboring meter;
   (h) wherein implementing the graph theoretic algorithm results in generating a spanning tree that increases a ratio of wireless enabled meters to access points.

2. The system of claim 1, wherein the graph theoretic algorithm includes:
   selecting a link wherein the link couples a node pair and a node is at least one of an access point, datasink node, routing node, or endpoint node;
   mapping the distance between the selected node pairs to a corresponding bridging power level wherein the bridging power level between a node pair is designated as a weight of the link;
   ranking the weighted links for each corresponding node pair in nondecreasing order of weight;
   selecting a next least weighted link and corresponding node pair as part of a subgraph;
   repeating the selecting of the next least weighted link and corresponding node pair as part of the subgraph until every node is part of the subgraph and generates a spanning tree used to configure routing information for the neighborhood area network.

3. The system of claim 1, wherein the remote server uses the graph theoretic algorithm to configure, over the wide area network and through the access point, the first set of wireless enabled meters as the one or more routing nodes and the second set of wireless enabled meters as the one or more end point nodes in the neighborhood network.

4. The system of claim 1, wherein the datasink node performs at least one of: (i) receiving metering information corresponding to each of the one or more routing nodes and one or more end point nodes; (ii) sending metering information to an access point; (iii) processing the meter information to generate sub-network status information and transmitting the sub-network status information to the access point; and (iv) reading meter status information and sending meter status information to the access point.

5. The system of claim 1 wherein:
   (a) the remote server transmits one or more control commands to an access point;
   (b) access point sends the one or more control commands to the one or more datasink nodes;
   (c) the one or more datasink nodes sends the one or more control commands to the one or more wireless enabled meters;
   (d) the one or more wireless enabled meters, based on the one or more control commands, performs at least one of:
      (i) modifying configuration of a wireless enabled meter;
      (ii) reading metering information;
      (iii) sending metering information to a datasink node;
      (iv) processing metering information;
      (v) sending the processed metering information to the datasink node;
      (vi) sending meter status information to the datasink node.

6. The system of claim 1, wherein:
   (a) access point sends the one or more control commands to the one or more datasink nodes;

(b) the one or more datasink nodes sends the one or more control commands to the one or more wireless enabled meters;

(c) the one or more wireless enabled meters, based on the one or more control commands, performs at least one of:
   (i) modifying configuration of a wireless enabled meter;
   (ii) reading metering information;
   (iii) sending metering information to a datasink node;
   (iv) processing metering information;
   (v) sending processed metering information to the datasink node;
   (vi) sending meter status information to the datasink node.

7. The system of claim 1, wherein:
(a) the one or more datasink nodes sends the one or more control commands to the one or more wireless enabled meters;
(b) the one or more wireless enabled meters, based on the one or more control commands, performs at least one of:
   (i) modifying configuration of a wireless enabled meter;
   (ii) reading metering information;
   (iii) sending metering information to a datasink;
   (iv) processing metering information;
   (v) sending processed metering information to the datasink node;
   (vi) sending meter status information to the datasink node.

8. The system of claim 1, wherein the access point transmits the metering information from one or more wireless enabled meters and the sub-network status information from one or more datasink nodes to the remote server over the wide area network.

9. The system of claim 1, wherein the graph theoretic algorithm is Kruskal's algorithm which generates a spanning tree for configuring routing information in the neighborhood area network.

10. The system of claim 1, wherein placement of one or more dummy nodes in the neighborhood area network maximizes a ratio of wireless enabled meters to access points wherein the dummy nodes are placed between two wireless enabled meters that have distance exceeding a predetermined threshold.

11. The system of claim 1, wherein location of one or more access points corresponds to location of one or more nodes as a result of selection by the graph theoretic algorithm.

12. The system of claim 1, wherein location of the one or more datasink nodes corresponds to location of one or more nodes as a result of selection by the graph theoretic algorithm.

13. The system of claim 1 wherein a datasink function is implemented by a node selected from the group consisting of a wireless enabled meter and an access point.

14. The system of claim 1, wherein a location of a datasink node corresponds to a location of a node as a result of selection by the graph theoretic algorithm wherein a location of the datasink node corresponds to the node which minimizes average number of hops from any node in the neighborhood area network to the datasink node for information flow.

15. A method for managing cost in a wireless enabled advanced metering infrastructure, the method comprising:
(a) configuring one or more datasink nodes with a datasink function and to be a data coordinator
(b) receiving and processing, by the one or more datasink nodes, metering information from one or more wireless enabled meters wherein a neighborhood area network includes the one or more wireless enabled meters;
(c) transmitting metering information to at least one access point;

(d) wherein each wireless enabled meter is configured to be a node, wherein the node is at least one of a routing node and an endpoint node;
(e) wherein a first set of wireless enabled meters are configured to be one or more routing nodes and a second set of wireless enabled meters are configured to be one or more end point nodes based on a graph theoretic algorithm and to configure each wireless enabled meter to a minimum power level based on a bridging distance to a neighboring meter;
(f) wherein implementing the graph theoretic algorithm results in generating a spanning tree that increases a ratio of the one or more wireless enabled meters to access points.

16. The method of claim 15, wherein the graph theoretic algorithm includes:
selecting a link wherein the link couples a node pair and a node is at least one of an access point, datasink node, routing node, or endpoint node;
mapping the distance between the selected node pairs to a corresponding bridging power level wherein the bridging power level between a node pair is designated as a weight of the link;
ranking the weighted links for each corresponding node pair in nondecreasing order of weight;
selecting a next least weighted link and corresponding node pair as part of a subgraph;
repeating the selecting of the next least weighted link and corresponding node pair as part of the subgraph until every node is part of the subgraph and generates a spanning tree used to configure routing information for the neighborhood area network.

17. The method of claim 15, wherein a remote server uses the graph theoretic algorithm to configure, over the wide area network and through the access point, the first set of wireless enabled meters as the one or more routing nodes and the second set of wireless enabled meters as the one or more end point nodes in the neighborhood network.

18. The method of claim 15, wherein the datasink node performs at least one of: (i) receiving metering information corresponding to each of the one or more routing nodes and one or more end point nodes; (ii) sending metering information to an access point; (iii) processing the meter information to generate sub-network status information and transmitting the sub-network status information to the access point; and (iv) reading meter status information and sending meter status information to the access point.

19. The method of claim 15, wherein:
(a) a remote server transmits one or more control commands to an access point;
(b) an access point sends the one or more control commands to the one or more datasink nodes;
(c) the one or more datasink nodes sends the one or more control commands to one or more wireless enabled meters;
(d) the one or more wireless enabled meters, based on the one or more control commands, performs at least one of:
   (i) modifying configuration of a wireless enabled meter;
   (ii) reading metering information;
   (iii) sending metering information to a datasink node;
   (iv) processing metering information;
   (v) sending the processed metering information to the datasink node;
   (vi) sending meter status information to the datasink node.

20. The method of claim 15, wherein:
(a) an access point sends the one or more control commands to the one or more datasink nodes;
(b) the one or more datasink nodes sends the one or more control commands to the one or more wireless enabled meters;
(c) the one or more wireless enabled meters, based on the one or more control commands, performs at least one of:
(i) modifying configuration of a wireless enabled meter;
(ii) reading metering information;
(iii) sending metering information to a datasink node;
(iv) processing metering information;
(v) sending processed metering information to the datasink node;
(vi) sending meter status information to the datasink node.

21. The method of claim 15, wherein:
(a) the one or more datasink nodes sends the one or more control commands to one or more wireless enabled meters;
(b) the one or more wireless enabled meters, based on the one or more control commands, performs at least one of:
(i) modifying configuration of a wireless enabled meter;
(ii) reading metering information;
(iii) sending metering information to a datasink;
(iv) processing metering information;
(v) sending processed metering information to the datasink node;
(vi) sending meter status information to the datasink node.

22. The method of claim 15, wherein an access point transmits the metering information from one or more wireless enabled meters and the sub-network status information from one or more datasink nodes to the remote server over the wide area network.

23. The method of claim 15, wherein the graph theoretic algorithm is Kruskal's algorithm which generates a spanning tree for configuring routing information in the neighborhood area network.

24. The method of claim 15, wherein placement of one or more dummy nodes in the neighborhood area network maximizes a ratio of wireless enabled meters to access points wherein the dummy nodes are placed between two wireless enabled meters that have distance exceeding a predetermined threshold.

25. The method of claim 15, wherein location of one or more access points corresponds to location of one or more nodes as a result of selection by the graph theoretic algorithm.

26. The method of claim 15, wherein location of the one or more datasink nodes corresponds to location of one or more nodes as a result of selection by the graph theoretic algorithm.

27. The method of claim 15, wherein a datasink function is implemented by a node selected from the group consisting of a wireless enabled meter and an access point.

28. The method of claim 15, wherein a location of a datasink node corresponds to a location of a node as a result of selection by the graph theoretic algorithm wherein a location of the datasink node corresponds to the node which minimizes average number of hops from any node in the neighborhood area network to the datasink node for information flow.

* * * * *